(12) United States Patent
Hatzack et al.

(10) Patent No.: US 7,637,228 B2
(45) Date of Patent: Dec. 29, 2009

(54) MILK HOSE WITH IMPACT-ABSORBING AREA

(76) Inventors: Wilfried Hatzack, Schelmengriesstrasse 1, D-86842 Tuerkheim (DE); Jakob Maier, Jr., Griesstrasse 4, D-86842 Tuerkheim (DE)

( * ) Notice: Subject to any disclaimer, the term of this patent is extended or adjusted under 35 U.S.C. 154(b) by 0 days.

(21) Appl. No.: 12/150,893

(22) Filed: May 1, 2008

(65) Prior Publication Data

US 2008/0308043 A1    Dec. 18, 2008

Related U.S. Application Data

(63) Continuation of application No. 10/508,648, filed as application No. PCT/EP03/02641 on Mar. 13, 2003, now abandoned.

(30) Foreign Application Priority Data

Mar. 19, 2002    (DE)    ............... 102 12 161

(51) Int. Cl.
*A01J 5/04*    (2006.01)

(52) U.S. Cl. ............... 119/14.51; 119/14.47; 119/14.5; 138/30

(58) Field of Classification Search ............... 119/14.47, 119/14.52, 14.51, 14.5, 14.54, 14.55; 138/173, 138/110, 172, 100, 30; 285/114, 115, 223, 285/256, 257, 417, 52, 53, 116

See application file for complete search history.

(56) References Cited

U.S. PATENT DOCUMENTS

| | | | |
|---|---|---|---|
| 4,196,696 | A | 4/1980 | Olander |
| 4,869,205 | A | 9/1989 | Larson |
| 2004/0025794 | A1 | 2/2004 | Maier et al. |

FOREIGN PATENT DOCUMENTS

| | | |
|---|---|---|
| AT | 364665 | 4/1981 |
| DE | 1607023 | 8/1970 |
| DE | 100 22 716 | 11/2001 |
| GB | 2 145 915 | 4/1985 |

OTHER PUBLICATIONS

International Search Report dated Jun. 3, 2003 (4 pages).
German Patent Office Search Report dated Nov. 7, 2002 (3 pages).

*Primary Examiner*—Michael R Mansen
*Assistant Examiner*—Joshua J Michener
(74) *Attorney, Agent, or Firm*—Flynn, Thiel, Boutell & Tanis, P.C.

(57) ABSTRACT

A milk hose for connecting a milk collecting piece to a teat cup in an automatic milking plant comprises a first end area which is adapted to be fixed to the connection element of the teat cup and a second end area which is adapted to be fixed to the connection element of the milk collecting piece. Furthermore, said second end area has provided thereon an impact-absorbing area comprising elongate impact-absorbing elements, which, when subjected to a radial impact load, are deformed and/or bent at least sectionwise in a predefined preferred direction, and/or nipple-shaped impact-absorbing elements which are deformed and/or bent when subjected to said radial impact load. In addition, an impact-absorbing device for mounting on a milk hose is described.

10 Claims, 4 Drawing Sheets

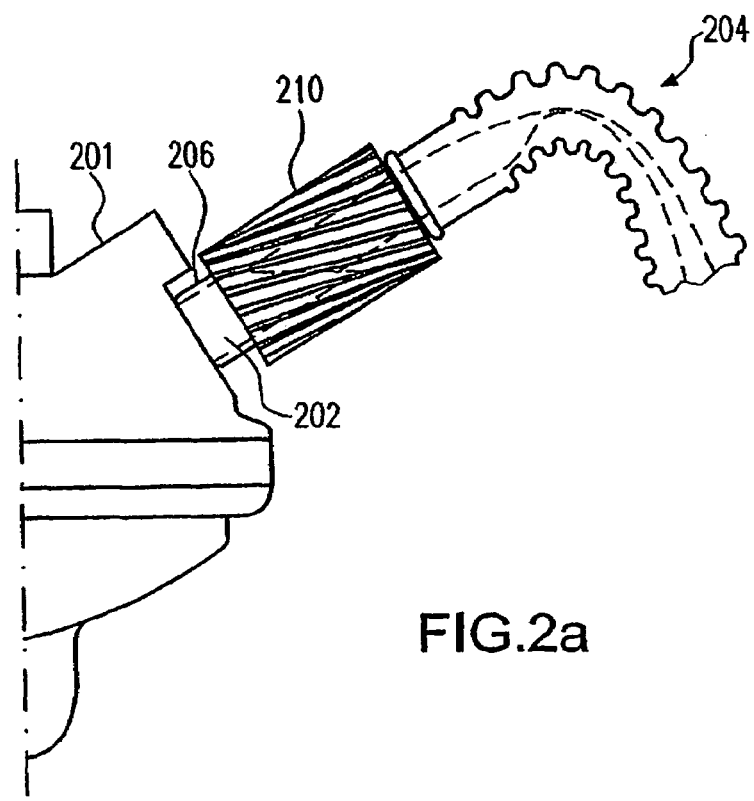
FIG.2a
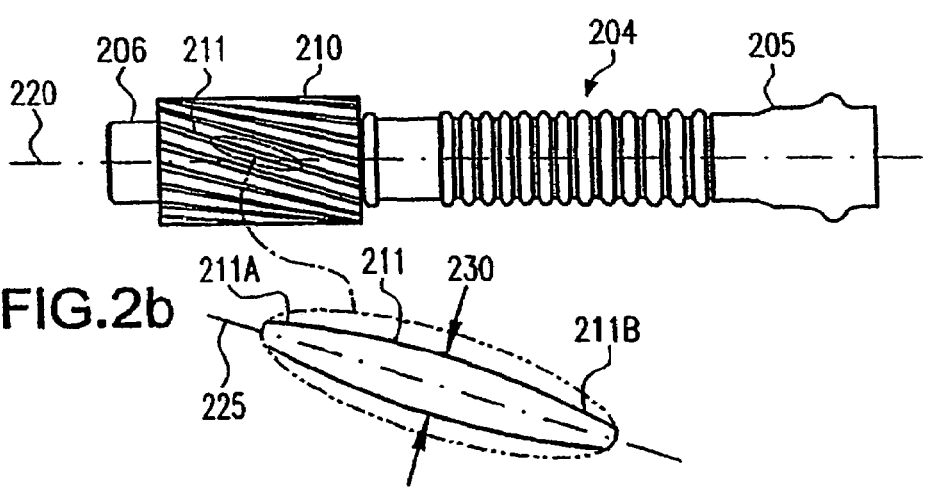
FIG.2b
FIG. 2d
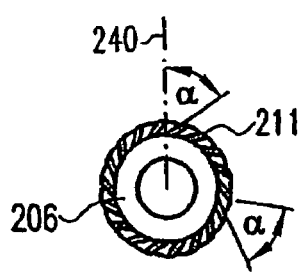
FIG.2c

MILK HOSE WITH IMPACT-ABSORBING AREA

CROSS-REFERENCE TO RELATED APPLICATIONS

This application is a continuation of U.S. application Ser. No. 10/508,648, filed Mar. 10, 2005, now abandoned which claims the benefit of International Application PCT/EP2003/02641, filed Mar. 13, 2003, which are incorporated herein by reference.

FIELD OF THE INVENTION

The present invention relates to a milk hose which establishes a fluid connection between a milk collecting piece and a teat cup in an automatic milking plant.

BACKGROUND OF THE INVENTION

In modern agricultural enterprises, animals are almost exclusively milked by means of an automatic milking plant which is essentially composed of a vacuum source, a plurality of teat cups, which are to be applied to the animal's udder, a milk collecting unit, which will also be referred to as milk collecting piece in the following, and a collecting tank. Furthermore, flexible connection lines are provided between the teat cup and the milk collecting piece as well as between the milk collecting piece and the collecting tank. The flexible connection line which is provided between the teat cup and the milk collecting piece and which will be referred to as milk hose hereinbelow is normally subjected to strong loads by kinking and impactlike effects, e.g. when said connection line is trodden on by the personnel or by animals. In order to explain the problems more clearly, a part of a typical automatic milking plant and its mode of operation will be described with reference to FIG. 1.

FIG. 1 shows a milk collecting piece 101 provided with connection elements 102 having each secured thereto a milk hose 104. To make things easier, only one milk hose is shown completely. A teat cup 103 is connected to the milk hose 104 as well, so that a fluid connection is established between the milk collecting piece 101 and the teat cup 103. The milk hose 104 comprises a first end area 105, which is pushed onto a respective connection element (not shown) of the teat cup 103, and a second end area 106, which is pushed onto the connection element 102. The additional components of the automatic milking plant, e.g. the vacuum source, the collecting tank as well as the connection line leading from the milk collecting piece 101 to the collecting tank are not shown for the sake of simplicity.

When the automatic milking plant is in use, in particular when the milking unit is applied and removed as well as during cleaning and transport of the milking unit, the milk hose 104 is constantly subjected to forces in the form of tensile loads and bending strains as well as impact loads. Before and after the milking process, for example, the danger exists that the animal will tread on parts of the milking unit, in particular on the milk hose 104. Furthermore, especially during trans-port of the milking unit, impact loads, which are caused e.g. by neighbouring teat cups and which act on the milk collecting piece 101 and there especially on the connection element 102, will occur more frequently due to the flexible connection between the individual parts, i.e. the teat cups 103 and the milk collecting piece 101. Especially the impact loads occurring when the milking unit is dropped and falls onto the milk hose in the area of the connection element will lead to microperforations in the milk hose and, finally, to a fracture of the milk hose. These impact loads, which occur again and again during daily use, lead, in the final analysis, to a premature wear of the material and consequently to a fracture of the milk hose 104 in the region of the second end area 106. A fracture of the milk hose 104 will not only cause additional costs, but the breaking of the material which, typically, begins gradually can have the effect that milk residues will collect in the second end area 106 for a certain period of time, whereby the quality of the milk will be impaired.

In view of the problems described hereinbefore, it is therefore desirable to provide a suitable device which prevents the negative effect of impact loads on the service life of the milk hose or which at least reduces this effect to a substantial extent.

SUMMARY OF THE INVENTION

According to the present invention, this object is achieved by a milk hose for connecting a milk collecting piece to a teat cup in an automatic milking plant, said milk hose comprising a first end area which is adapted to be fixed to the connection element of the teat cup and a second end area which is adapted to be fixed to the connection element of the milk collecting piece. The second end area is provided with an impact-absorbing area comprising elongate impact-absorbing elements, which, when subjected to a radial impact load, are deformed and/or bent at least sectionwise in a predefined preferred direction. Additionally or alternatively, the impact-absorbing area comprises nipple-shaped impact-absorbing elements which are deformed and/or bent when subjected to said radial impact load.

According to a further aspect of the present invention, an impact-absorbing device for attachment to a milk hose is provided, which comprises an impact-absorbing area having the same features as the above-described impact-absorbing area and which is additionally implemented such that the device is adapted to be fixed to an end area of the milk hose establishing a fluid connection between a milk collecting piece and a teat cup.

The elongate impact-absorbing elements are implemented such that, in the case of radial impact loads, i.e. when a force acts in a substantially radial direction on the milk hose, energy will be absorbed due to the deformation and/or bending in a direction that is, at least sectionwise, characteristic for each of the elongate impact-absorbing elements. The existence of a preferred direction for said deformation and/or bending will therefore guarantee an efficient cushioning of the impact load, whereby material fatigue and consequently breaking of the milk hose in the region of the second end area will be reduced to a substantial extent. Alternatively, or additionally, nipple-shaped impact-absorbing elements are provided, which, due to the nipple-shaped structure, will also absorb energy by deformation and/or bending and cause a reduction of material fatigue in this way. The kinetic energy of the impactlike force acting on the end area is essentially used for elastically deforming the impact-absorbing elements and part of this energy is re-converted into kinetic energy when the original shape of the impact-absorbing elements is being restored, so that the formation of microperforations will be reduced to a substantial extent. Furthermore, a direct contact with the material areas defining the fluid connection of the milk hose is avoided to a very large extent in the case of a collision with a body applying the impact load, since the impact-absorbing elements act so to speak as buffers. In this way, "injuries" of the second end area can be prevented or at least reduced due to the buffering effect of the impact-absorbing elements, even if the objects involved in the collision should be sharp-edged objects.

According to a further embodiment, the elongate impact-absorbing elements are inclined, at least sectionwise, relative to the normal to the surface of the second end area.

On the basis of this structural design, it is thus possible to efficiently define a preferred direction in which the elongate absorbing elements will bend under the influence of an essentially radial impact load. The at least sectionwise inclined elongate impact-absorbing elements bend under the influence of the load so that the inclination angle increases still further, whereby an improved cushioning effect is achieved in comparison with elongate ribs which are radially oriented throughout the longitudinal direction.

Preferably, the elongate impact-absorbing elements comprise at least one section forming an inclination angle with the normal to the surface, said angle ranging from 8° to 50°. Within this range of values, the elongate impact-absorbing elements will bend reliably in the direction in which the inclination angle is enlarged, the degree of absorption capability, i.e. the "softness" of cushioning, being determinable by the inclination angle, among other factors.

In accordance with a further embodiment, the elongate impact-absorbing elements are inclined, at least sectionwise, relative to the longitudinal axis of the second end area. In this way, a great variety of patterns of elongate absorbing elements can be formed; due to the inclination relative to the longitudinal axis, these patterns of elongate absorbing elements can provide a more far-reaching stabilization of the second end area, e.g. with respect to torsional stiffness, etc.

In accordance with another embodiment, the elongate impact-absorbing elements are oriented such that a first section of each element forms a first inclination angle with the normal to the surface, and that a second section forms a second inclination angle which differs from the first one.

According to a preferred embodiment, the value of the inclination angle varies continuously from the first section to the second section. In this way, it is possible to adjust different impact-absorbing effects in different areas.

In accordance with a further embodiment the first inclination angle is inverse to the second inclination angle, the transition being of a continuous nature.

This structural design of the elongate impact-absorbing elements has the effect that a high cushioning capability is guaranteed at the beginning and at the end of the impact-absorbing area, whereas in the middle, where the inclination angle formed with the normal to the surface is approximately equal to 0, a comparatively high stiffness of the second end area of the milk hose is provided.

In accordance with a further embodiment, the elongate impact-absorbing elements have a thickness in the range of from 0.5 to 5 mm. With this range of values, a suitable impact-absorbing and buffering effect can be adjusted so that e.g. a higher strength of the milk hose will be achieved in an area of large thickness and an increased buffering effect will be achieved in an area of small thickness. The thickness within one impact-absorbing element may vary or neighbouring elements may have a thickness which is uniform in the individual element but different from the thickness of the neighbouring elements.

In accordance with a further embodiment, the height of the individual elongate impact-absorbing elements is in a range of from 1 to 10 mm. Like the thickness, also the height of the elongate impact-absorbing elements can be used for adequately adjusting the absorbing effect.

In accordance with a further embodiment, the thickness and/or the height of the elongate impact-absorbing elements vary/varies along the longitudinal direction of the elements. This allows a purposeful adjustment of the properties of the impact-absorbing area so that it is e.g. possible to improve the cushioning effect by a smaller thickness and/or a corresponding height, whereas in another section of the element a stiffening of the second end area is simultaneously desired and achieved by a larger thickness and/or an adapted height.

In accordance with another embodiment, the impact-absorbing area has a length of 20 to 60 mm in the longitudinal direction. This range of lengths allows, on the one hand, a sufficient overlap with the connection element so as to achieve a cushioning effect especially in this area of the milk hose, and, on the other hand, it is dimensioned such that the rest of the milk hose will be sufficiently long for guaranteeing the necessary flexibility of the milk hose.

In accordance with a further embodiment, the impact-absorbing area and the second end area of the milk hose are formed of one piece of material. This allows the milk hose to be produced by making use of a single injection mould and by executing a single injection moulding process so that the respective costs will not increase in comparison with a conventional milk hose.

In accordance with another embodiment, nipple-shaped impact-absorbing elements are provided, which have a diameter that ranges from 1 to 8 mm and a length that ranges from 1 to 10 mm. As has already been mentioned, the nipple-shaped impact-absorbing elements can be provided alternatively, i.e. exclusively, or in combination with the elongate impact-absorbing elements; especially the above-mentioned ranges of values for the diameter and the length of the nipple-shaped elements permit the absorption capability and the buffering effect of the impact-absorbing area to be adjusted within a desired range.

In accordance with a further embodiment, the nipple-shaped impact-absorbing elements provided in the impact-absorbing area have at least two different lengths and/or diameters. By means of the simultaneously existing different lengths and/or diameters, the elastic and the cushioning properties of the impact-absorbing area can be adjusted very precisely. It is e.g. possible to provide in a first area comparatively long, thin nipples, so that the cushioning obtained there will be very "soft", whereas the nipples provided in a second area may be shorter and thicker for absorbing higher loads.

In accordance with another embodiment, rib-shaped reinforcement elements are provided in addition to the nipple-shaped impact-absorbing elements, said rib-shaped reinforcement elements being oriented essentially in the radial direction, so that an increased longitudinal stability of the second end area is obtained by them. On the basis of the combined use of the rib-shaped reinforcement elements and of the nipple-shaped impact-absorbing elements the milk hose can be provided with an end area which is extremely stable in the longitudinal direction and also torsion-proof and which, due to the nipple-shaped elements, additionally has a marked capability of absorbing impact loads.

In accordance with a further embodiment, the height of the rib-shaped reinforcement elements is smaller than the length of the nipple-shaped impact-absorbing elements. By means of this arrangement, it is achieved that a short impact load will be absorbed by the longer nipple-shaped elements, whereas the rib-shaped reinforcement elements have an increased stability in the longitudinal direction against forces acting on the milk hose for a longer period of time.

In accordance with another embodiment of the impact-absorbing device for attachment to a milk hose, a fastening element is provided for fastening the impact-absorbing device to the milk hose. With respect to the structural design of the impact-absorbing area of the impact-absorbing device, reference is made to the above-mentioned embodiments and to the detailed description following hereinbelow.

Further advantageous embodiments are defined in the subclaims.

BRIEF DESCRIPTION OF THE DRAWINGS

In the following, special embodiments will be described in detail making reference to the accompanying drawings, in which:

FIG. 2a shows schematically a fragmentary side view of a milk collecting piece with a milk hose according to an embodiment of the present invention;

FIG. 2b shows a top view of the milk hose of FIG. 2a;

FIG. 2c shows a cross-section perpendicular to the longitudinal axis of the milk hose according to FIG. 2a;

FIG. 2d shows an enlarged representation of a detail of FIG. 2b;

DETAILED DESCRIPTION OF THE INVENTION

Figure 1:
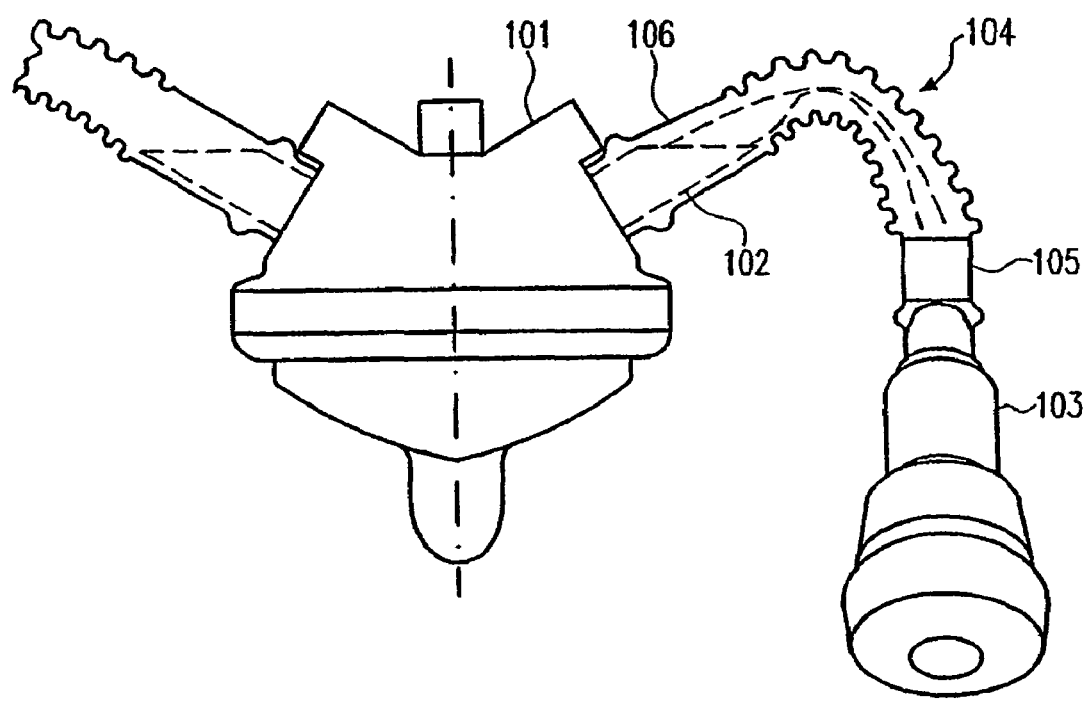
FIG. 1 shows schematically a part of a conventional milking plant for clearly explaining the problem underlying the present application.

Making reference to FIG. 2a to 2c, illustrative examples will be described in the following; in said FIG. 2a to 2c, the same reference numerals are always used for the same components even if the component in question is not shown in one of the individual representations.

In FIG. 2a, an exemplary embodiment is shown in a schematic side view, a milk hose 204 being secured to a connection element 202 of a milk collecting piece 201. The milk hose 204 is pushed onto the connection element 202 with an end area 206 thereof. Furthermore, the end area 206 has provided thereon an impact-absorbing area 210, which, when subjected to a force with a radial component, produces a cushioning effect.

FIG. 2b shows the milk hose 204 in more detail in a side view, the milk collecting piece 201 being not shown. The milk hose 204 with a first end area 205 is shown in a straight condition, a longitudinal axis 220 being shown in said figure. The impact-absorbing area 210 is provided with elongate impact-absorbing elements 211 which, in the embodiment shown in FIG. 2b, extend at an oblique angle to the longitudinal axis 220. The angle formed by said elongate impact-absorbing elements 211 and the longitudinal axis 220 is not limited and can be selected in accordance with the desired buffering and stabilizing effect. This angle can be in the range of from 0° to 90°.

FIG. 2c shows a cross-section perpendicular to the longitudinal axis 220, a normal 240 to the surface or an axis in the radial direction being shown at the foot of two respective exemplary elongate impact-absorbing elements 211. The elongate impact-absorbing elements 211 are arranged such that the height of the elements 211 and the thus defined direction forms an angle α with said normal 240 to the surface, said angle α varying at least in a section of said elements 211 in the range of 8 to 50°.

As can be seen from FIG. 2c, a force applied approximately in the direction of said normal 240 to the surface will have the effect that the impact-absorbing elements 211 acted upon will be deformed and/or bent, whereby a cushioning and buffering effect is achieved. By means of the inclination angle α it is achieved that impactlike forces, which are applied to the end area 206 essentially along the radial direction 240, will always result in deformation and/or bending of the elongate impact-absorbing elements 211 in a substantially predetermined direction. The cushioning effect achieved in this way will be essentially higher than the effect produced by corresponding elongate elements which are, essentially, oriented only in the radial direction, i.e. parallel to the direction 220. The cushioning effect of the impact-absorbing elements 211 depends on the type of material used, the distance between the individual impact-absorbing elements 211, the height of said elements and the thickness thereof.

According to preferred embodiment, the elongate impact-absorbing elements 211 are made of the same material as the milk hose 204; this can be done in a single production process in an advantageous manner. A suitable material for the elongate impact-absorbing elements 211 is e.g. a silicone mixture of the type used for conventional milk hoses. The distance between two elongate impact-absorbing elements 211 can be in the range of 0.5 to 8 mm.

In accordance with a further embodiment, which is schematically shown in the enlarged representation in FIG. 2d, an impact-absorbing element 211 is shown, which comprises a first section 211A and a second section 211B. A longitudinal axis 225 characterizes the longitudinal direction of the elongate impact-absorbing element 211 and the arrows 230 represent the thickness of the element 211. As can be seen in this representation, the thickness 230 is variable in the longitudinal direction 225 in the case of this embodiment insofar as in the first section 211A and in the second section 211B the thickness is essentially identical but smaller than in the intermediate area. These different thicknesses can therefore be used for adjusting the cushioning properties of the individual elements. It follows that, in the example shown, sections 211A and 211B can be deformed or bent more easily than the central area of maximum thickness. In a similar way, the height of the elongate impact-absorbing elements 211 can vary in the longitudinal direction 225.

In a further embodiment, the inclination angle α (cf. FIG. 2c) between the radial direction 240 and the height direction of the elongate impact-absorbing element 211 in section 211A differs from the angle in section 211B. The inclination angle α can, for example, decrease continuously from a fixed initial value towards the middle so as to assume finally in section 211B a negative value whose magnitude can essentially correspond to the initial value α. By varying the inclination angle, it is therefore also possible to adjust the cushioning effect of the impact-absorbing element 211 along the length of the impact-absorbing area 210.

In preferred embodiments the magnitude of the inclination angle is in the range between 8 and 50°. It follows that, by varying the inclination angle, the cushioning effect can be adjusted sectionwise in the elongate impact-absorbing elements; in the areas having a small inclination angle or the inclination angle 0, an increased stabilization of the end area 206 will be achieved in the longitudinal direction 220.

Typically, the impact-absorbing area 210 has dimensions of at least 20 to 60 mm in the longitudinal direction 220, whereby the area of the connection element 202 for many frequently used milk collecting pieces 201 is covered. Especially the effects of impact loads, which are extremely detrimental in this area, can be markedly reduced in this way, whereby the service life of the milk hose 204 as well as hygiene in the connection area will be increased.

FIG. 3a to 3e show, in a schematic form, additional embodiments for the structural design of an impact-absorbing area.

Figure 3A:
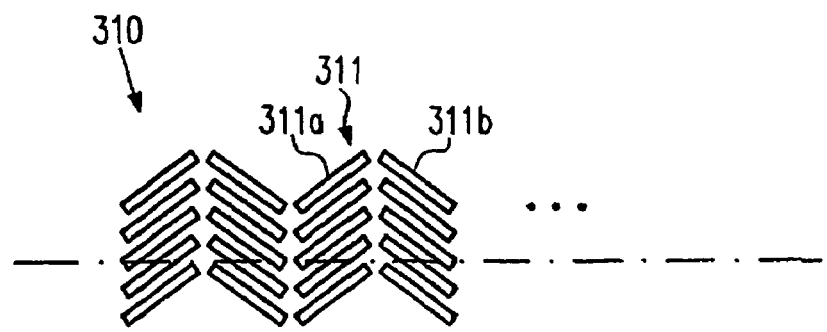
FIG. 3a to 3f show schematic representations of further exemplary embodiments of the impact-absorbing area.

FIG. 3a shows a schematic side view of an impact-absorbing area 310 in the case of which elongate impact-absorbing elements 311 comprise first sections 311a and second sections 311b. The first sections 311a are arranged at an oblique angle relative to a longitudinal direction 320 so that the obliquely arranged sections 311a will impart to the impact-absorbing area 310 an increased stability in the case of large-area squeezing. It should be noted that said first areas 311a may, however, also extend comparatively parallel to the longitudinal axis 320. In a similar way, the second sections 311b are arranged at an oblique angle to the longitudinal axis 320, but preferably at an angle of inclination which is inverse to that of said first sections 311a. It will be advantageous when the first sections 311a have a first angel of inclination in their height direction relative to the radial direction (cf. FIG. 2c) and when the second sections 311b have a second angle of inclination whose magnitude can be equal to that of the first angle of inclination but whose direction is different from that of said first angle of inclination. This will have the effect that, when a force is applied in a non-radial direction, e.g. when the impact-absorbing area comes into contact with a teat cup, one of the two sections 311a and 311b will always be oriented such that an optimum cushioning effect will be produced in one of said two sections. It follows that, if the impact-absorbing area comes into contact with an object and if the area of contact is not too small, a cushioning effect can be achieved in one of the two sections 311a or 311b. If the force is applied in a substantially radial direction, both sections 311a and 311b will contribute to the cushioning effect. As far as the structural design of the individual sections 311a, 311b is concerned, the aspects which have already been specified with respect to the embodiments described in connection with FIG. 2a to 2c apply here as well.

Figure 3B:
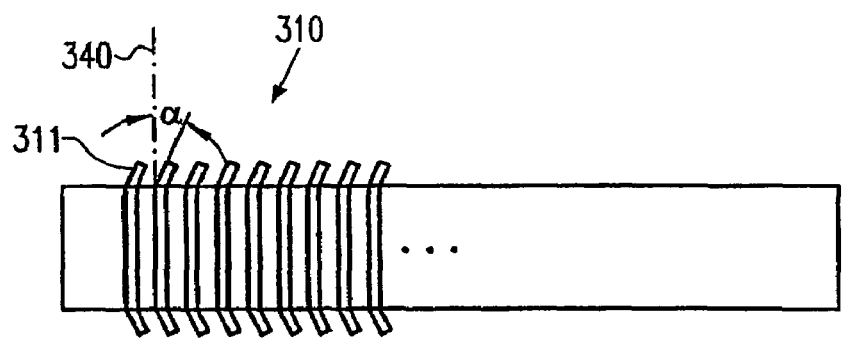

FIG. 3b shows a further variant of the impact-absorbing area 310, in the case of which annular impact-absorbing elements 311 are provided. In this connection, it should be noted that the term "elongate" used in the description and in the claims is to be interpreted such that these annular elements 311 have a length that corresponds essentially to the circumference, i.e. elongate means that the dimensions in one direction exceed by far the dimensions in a second direction which is perpendicular to said first one and which is referred to as thickness. As can be seen in the figure, the inclination angle α between the radial direction 340 and the height direction of the impact-absorbing elements 311 is of such a nature that, similar to the embodiments described with respect to FIG. 2, a load applied in an almost radial direction 340 will result in bending and/or deformation in a predefined direction. As far as the thickness, the height, the distances and the material used for the impact-absorbing elements 311 are concerned, the aspects described hereinbefore apply here in the same way.

Figure 3C:
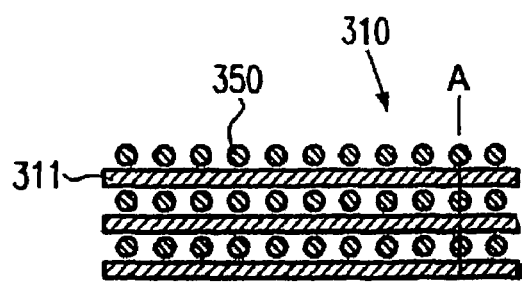
Figure 3F:
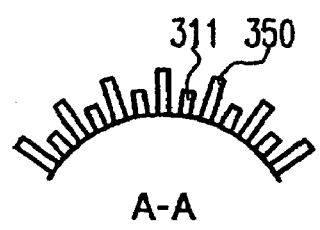

FIG. 3c shows schematically a further embodiment of the impact-absorbing area 310, in the case of which elongate elements 311 are provided in combination with nipple-shaped impact-absorbing elements 350. As far as the angle of inclination, the thickness and the height is concerned, the elongate elements 311 can have a structure similar to that shown hereinbefore in connection with the elongate impact-absorbing elements 311 of FIGS. 3a and 3b as well as the elements 211 in FIG. 2. In a preferred embodiment, the elongate elements 311 serve as reinforcement elements increasing the longitudinal stability of the end area of the milk hose. The nipple-shaped elements 350 arranged adjacent to said reinforcement elements 311 serve to cushion impact loads applied from outside. For this purpose, the nipple-shaped elements 350 exceed the elongate reinforcement elements 311 in length and in height. In FIG. 3f, a schematic cross-sectional representation through line A-A of FIG. 3c is shown in which the difference in height between the elements 311 and 350 can be seen. It follows that, when a force is applied, the nipple-shaped elements 350 will first be deformed and/or bent whereby the effect of the force occurring will be reduced, whereas the elongate reinforcement elements 311 hardly contribute to the cushioning effect, but increase the stability in the longitudinal direction. In one embodiment, the values for the diameter of the nipple-shaped elements 350 range from 1 to 8 mm, whereas the height ranges from 1 to 10 mm. As far as the elongate reinforcement elements 311 are concerned, their height ranges preferably from 1 to 5 mm and their thickness from 2 to 8 mm. In an embodiment which is not shown, the nipple-shaped elements 350 can have different diameters and/or lengths and heights. For example, nipple-shaped elements 350 of a first greater height can be provided for permitting soft cushioning, and nipple-shaped elements 350 of a second height can be provided for cushioning stronger forces. In a similar way, the radius of the individual nipple-shaped elements 350 can be varied so as to achieve a desired cushioning effect. Instead of two different heights and diameters, it is, of course, also possible to use a plurality of different values. Furthermore, the elongate reinforcement elements 311 can be provided in a plurality of geometrical patterns. In particular, the reinforcement elements 311 can be provided in the patterns shown in FIGS. 3a and 3b as well as in various modifications thereof.

Figure 3D:
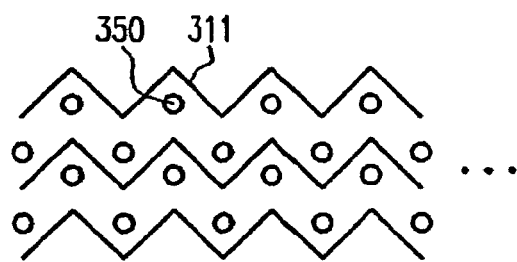

FIG. 3d shows schematically a further embodiment comprising elongate impact-absorbing elements and elongate reinforcement elements 311, respectively, and nipple-shaped impact-absorbing elements 350. Just as in the case of the above-mentioned embodiment, the nipple-shaped elements 350 provided in this embodiment are preferably higher than the reinforcement elements 311. By means of the zigzag shape of the reinforcement elements 311 an increased strength is achieved in the connection area in the radial as well as in the axial direction of the milk hose, the nipple-shaped elements 350 guaranteeing simultaneously the necessary cushioning effect in the case of impact loads. In this embodiment, the nipple-shaped elements can be provided in the form of individual elements or in the form of a group with different radii and/or heights. Furthermore, reinforcement elements 311 having a comparatively large thickness, e.g. larger than 5 mm, can be provided, if a high stiffness of the milk hose should be necessary in this area. Where appropriate, the reinforcement elements 311 can be provided in the form of double rows or multiple rows.

Figure 3E:
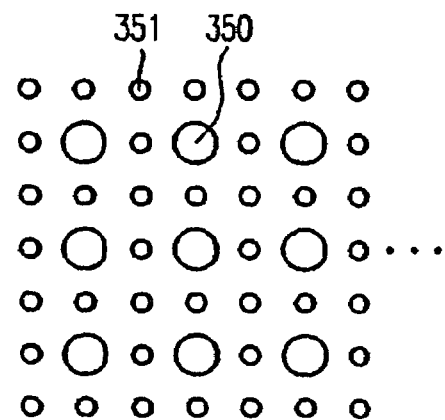

FIG. 3e shows a further embodiment which exclusively comprises nipple-shaped elements 350 and 351. In this embodiment, the nipple-shaped elements 350 are shown as elements having a comparatively large diameter, e.g. in the range of from 3 to 8 mm, whereas the elements 351 surrounding the nipple-shaped elements 350 are shown as elements having a smaller diameter, e.g. in the range of from 1 to 5 mm. By means of this arrangement, a graded cushioning effect can again be achieved. Instead of two different nipple-shaped impact-absorbing elements, it is also possible to use a plurality of different elements.

Figure 4:
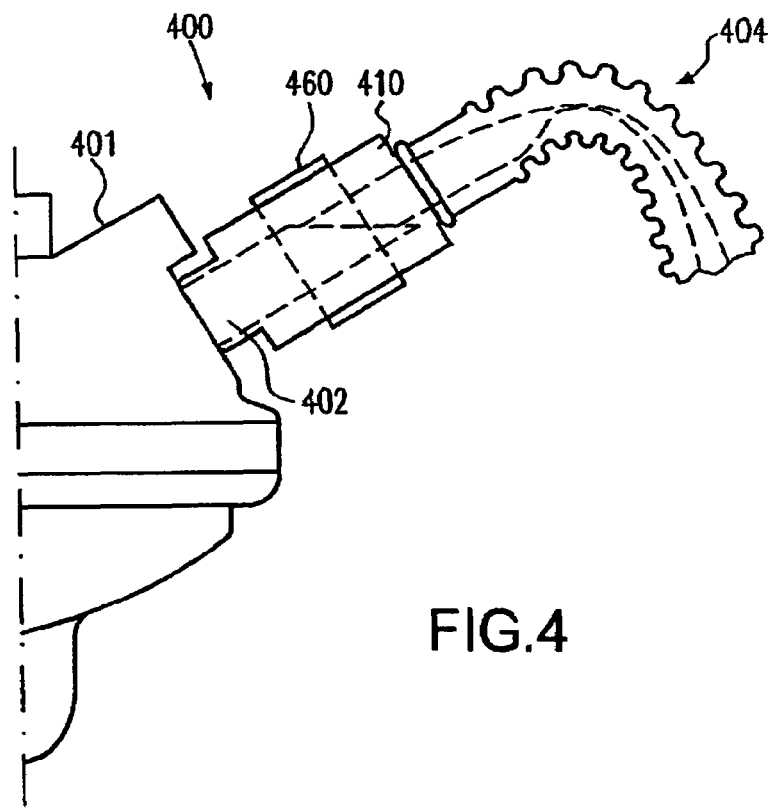
FIG. 4 shows schematically an embodiment of the impact-absorbing device which is secured to a milk hose by means of a fastening element.

FIG. 4 shows schematically a mountable impact-absorbing device 400. In FIG. 4, the connection element 402 of a milk collecting piece 401 has a milk hose 404 secured thereto. Furthermore, the impact-absorbing device 400 is secured to the milk hose 404 by means of a fastening element 460. The impact-absorbing device 400 comprises an impact-absorbing area 410 whose structural design can correspond to the design that has been described hereinbefore with respect to FIG. 2 to 3. The impact-absorbing area can, in particular, be produced from an elastic material as an integral component, e.g. in the form of a band, which is then arranged around an end area of the milk hose 404 by means of the fastening element 460. The fastening element 460 can be provided e.g. in the form of a hose clamp, a strip, a clamp, a Velcro strip, and the like. Existing conventional milk hoses can easily be retrofitted in this way.

Furthermore, it should be noted that the respective previously described embodiments can be combined with one another so that a desired protective effect is achieved for the milk hose. It goes without saying that the arrangements shown in the exemplary embodiments, i.e. the arrangement of the elongate impact-absorbing elements and/or of the nipple-shaped impact-absorbing elements in the impact-absorbing areas, can be varied as long as these elements produce a buffering effect by deformation and/or bending. The elongate impact-absorbing elements are always implemented such that, when subjected to a force with a radial component, they will have a preferred direction for said deformation or bending. In addition, the impact-absorbing area can be provided not only on one end area of the milk hose but also on the other end area and/or in the central area thereof. The cushioning and/or buffering effect is preferably adjusted such that an advantageous overall effect will be achieved for the respective milk hose area, i.e. in the central area a high flexibility of the milk hose is demanded so that a "soft" cushioning, e.g. in the form of long, thin nipples and/or thin elongate elements that are arranged at comparatively large distances from one another, will be used in this area.

The invention claimed is:

1. A milk hose for connecting a milk collecting piece to a teat cup in an automatic milking plant, comprising:
   a first end area adapted to be fixed to a connection element of the teat cup;
   a second end area adapted to be fixed to a connection element of the milk collecting piece;
   at least said second end area comprising:
   an impact-absorbing area comprising elongate impact-absorbing elements running longitudinally on said milk hose, each of said elongate impact-absorbing elements having a central axis taken in cross-section transverse to said milk hose and defined as the centerline of that portion of the elongate impact-absorbing element extending from the surface of the milk hose,
   wherein said central axis is inclined relative to a respective radial direction normal to the surface of the second end area at the location of the respective impact absorbing element; and
   wherein the elongate impact-absorbing elements are oriented such that a first section of each element forms a first inclination angle with respect to a normal vector to the surface of the second end and a second section of each element forms a second inclination angle with respect to the normal vector to the surface of the second end, the inclination angle varying continuously from the first section to the second section.

2. A milk hose according to claim 1, wherein the elongate impact-absorbing elements comprise at least one section forming an inclination angle with said normal to the surface, said angle ranging from 8° to 50°.

3. A milk hose according to claim 1, wherein the elongate impact-absorbing elements are, at least sectionwise, arranged at an oblique angle relative to a longitudinal axis of the second end area.

4. A milk hose according to claim 1, wherein the elongate impact-absorbing elements have a thickness in the range of from 0.5 to 5 mm.

5. A milk hose according to claim 1, wherein the height of the individual elongate impact-absorbing elements is in a range of from 1 to 10 mm.

6. A milk hose according to claim 1, wherein at least one of the thickness and the height of the individual elongate impact-absorbing elements varies, at least sectionwise, along the longitudinal direction of the impact-absorbing elements.

7. A milk hose according to claim 1, wherein the impact-absorbing area has a length of 20 to 60 mm in the longitudinal direction.

8. A milk hose according to claim 1, wherein the impact-absorbing area and the second end area of the milk hose are formed of one piece of material.

9. An impact-absorbing device for attachment to a milk hose, comprising:
   an impact-absorbing area comprising elongate impact-absorbing elements which, when subjected to a radial impact load, are at least one of deformed and bent at least sectionwise in a predefined preferred direction;
   wherein said impact-absorbing device is implemented such that said impact-absorbing device is adapted to be fixed to an end area of the milk hose establishing a fluid connection between a milk collecting piece and a teat cup;
   wherein the elongate impact-absorbing elements each have a central axis and are arranged such that the central axis is inclined relative to a respective radial direction normal to the surface of the end area of the milk collecting piece in the mounted condition at the location of the respective impact absorbing element; and
   wherein the elongate impact-absorbing elements are oriented such that a first section of each element forms a first inclination angle with respect to a normal vector to the surface of the end area and a second section of each element forms a second inclination angle with respect to the normal vector to the surface of the end area, the inclination angle varying continuously from the first section to the second section.

10. An impact-absorbing device according to claim 9 further comprising a fastener configured to fasten the impact-absorbing device to said end area.

* * * * *